Jan. 2, 1968

W. H. SANDERSON 3,360,867

BATCH-TYPE FLUIDIZING APPARATUS AND PROCESS

Filed Nov. 18, 1965

INVENTOR
Walter H. Sanderson,
BY Watson, Cole, Grindle
& Watson,
ATTORNEYS

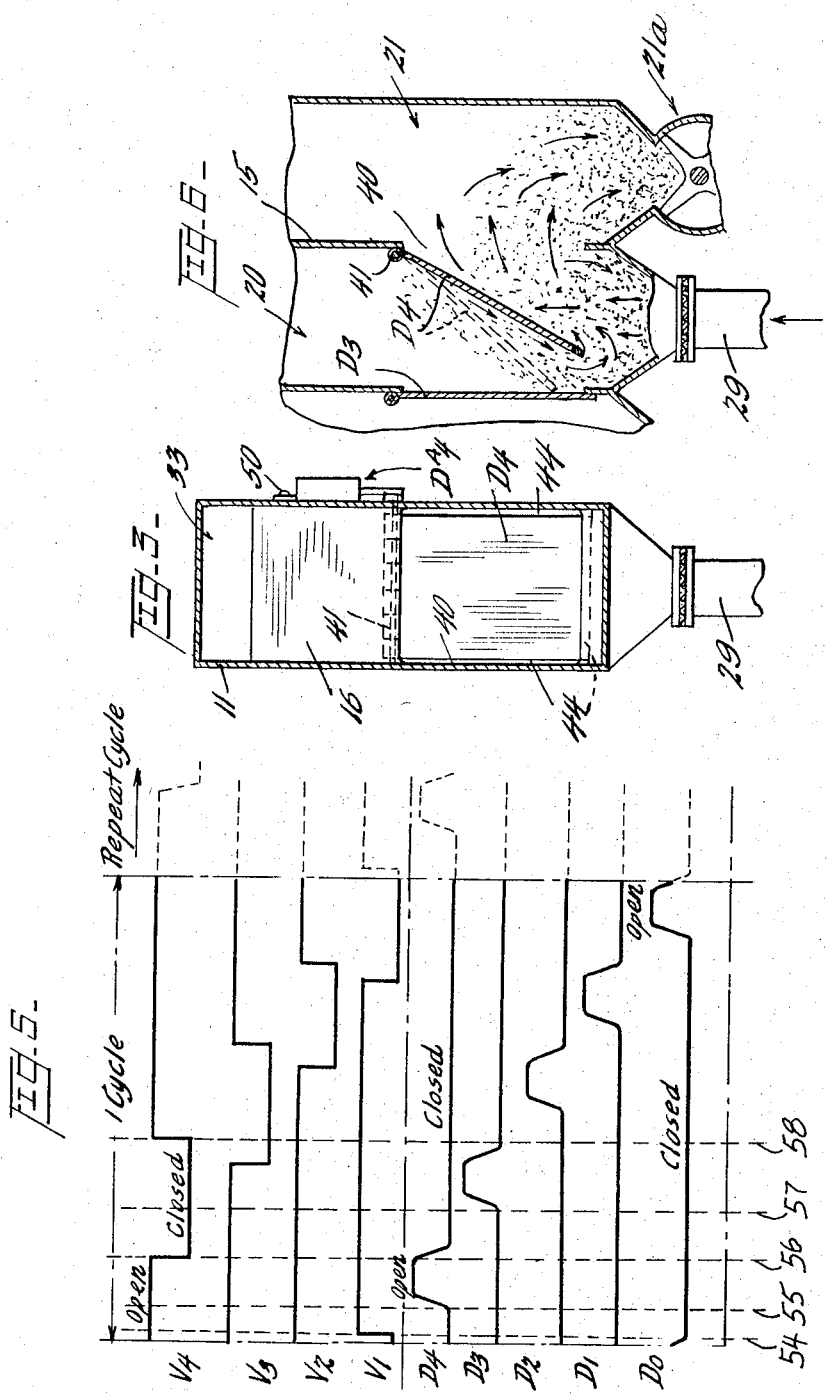

3,360,867
BATCH-TYPE FLUIDIZING APPARATUS AND
PROCESS
Walter H. Sanderson, Greenbrook, N.J., assignor to Komline-Sanderson Engineering Corporation, Peapack, N.J., a corporation of New Jersey
Filed Nov. 18, 1965, Ser. No. 508,537
6 Claims. (Cl. 34—10)

ABSTRACT OF THE DISCLOSURE

An arrangement for fluiding solids in batches through a series of horizontally in-line chambers wherein transfer between the chambers is provided by the fluidizing airstream due to a pressure differential between the chambers. A pivotal door is provided to cover the transfer opening between the chambers during the fluidizing operation and is opened across the upstream chamber to cause a deflecting action of the solids during the transfer operation. A control system is provided to operate the fluidizing valves and transfer doors in proper sequence.

---

The present invention relates to the art of contacting relatively finely divided solids with a gas or vapor and, more particularly, to a batch-type fluidizing apparatus and process utilizing a plurality of in-line chambers or enclosed stations.

It has long been recognized in this art that the use of multiple chambers and resultant smaller batches of material to be treated at a time is more efficient and gives more uniform results than other fluidizing operations. By breaking up a large air drying operation into a plura ity of stages or steps for example, there has been found to be requirement for less air pressure to cause the desired intimate contact between the finely divided solids and the air. Further, in a multi-chamber fluidizing operation, it is much easier to control the conditions under which the solids are being treated and to minimize the possibility of having isolated portions of the batch material that are not properly contacted with the treating gas. In addition, multi-chamber apparatus is preferred in most cases since it lends itself to easy adaptation to the deired mode of operation in accordance with the material being treated since the total contact time between the gas and the solids can be increased or decreased by merely adding or subtracting a chamber in the treating unit.

One problem that has arisen in the use of multi-chamber arrangements for treating finely divided solids is in the area of successfully transferring the batch of particles from one chamber to the next during the staged operation. Heretofore insofar as I am aware, this transfer from one chamber to the next has been performed by rel'ance on such factors as the physical condition of the particles being treated or the force of gravity on said particles. In the first instance, the size of the particles used in the operation must be carefully controlled to bring about the proper transfer at the desired time and, accordingly, such apparatus is very limited in its application of use. In the second type of fluidizing arrangements that either totally or partially rely on gravity to cause the transfer of the batch from one chamber to the next, the proper operation of the device is directly related to the size or mass of the individual particles being processed, thus again limiting the versatility of the prior art devices.

Also, it has been found that in gravity feed devices there is a tendency for particles to become trapped in the chambers due to the lack of a positive driving force on the particles during transfer with the resultant blocking of the passages between the chambers requiring costly shutdown of the unit to clean said passages. In the gravity feed arrangements where a stream of fluid is used to fluidize the bed of material, there has proven to be a tendency for undesirable feedback of particles of material from a downstream chamber to the adjacent upstream chamber due to a lack of a positive pressure differential across the passage during transfer or due to the lack of positive isolation means during fluidization of the material, such as is provided by a door or gate. Further, in certain cases where the transfer operation is dependent on the state of the treated condition of the particles, there tends to be a lack of complete utilization of each chamber due to the fact that each fluid power means for the fluidizing operation must be regulated to fit the particular condition of the particles being treated in each successive chamber.

Therefore, it is an object of the present invention to provide an improved multi-chamber fluidizing apparatus and process that overcomes the above mentioned disadvantages.

It is a further object of the present invention to provide a fluidizing operation that provides for a positive transfer of the batch material from one chamber to the next.

It is another object of this invention to provide an apparatus of the type described that allows for isolation of the chambers during fluidizing operation.

It is still another object of the present invention to provide an improved fluidizing apparatus and process having increased efficiency and giving more uniform results on a wide range of types of finely divided solids.

In the preferred embodiment of the invention shown for the purpose of illustrating the invention, there is provided a plurality of vertically extending chambers arranged in line with a passage between the adjacent chambers in the lower portion of said chambers through which the transfer from one to the other is made. The fluidizing operation is provided by fluid power means that inject a defined stream into the chamber to suspend the solid material batch in that chamber so as to provide intimate treating contact between the solid particles and the treating fluid. Each fluid power means has an associated interrupted valve so that the high energy fluid stream may be periodically discontinued in the downstream chamber so as to create a positive differential pressure across the connecting passage for rapid transfer of the relatively lightweight particles to said downstream chamber through said connecting passage. Each of these passages that connect the chambers has a door to positively isolate the fluidized material in one chamber from the fluidized material in the other during treatment to prevent undesirab'e feed back of the material. Each of these doors serves an important secondary function according to the invention in that they are positionable across the upstream chamber in opposed relationship to the fluid power means so as to serve to deflect or divert the particles carried by the high-energy fluid stream from the upstream chamber to the downstream chamber during the transfer operation.

According to the process of the present invention, there is provided a novel operation involving a plurality of in-line stations where fluidizing of successive batches of relatively finely divided solid material takes place. According to the basic concept of the invention, during each cyclic operation the batch of material is transferred by a fluid pressure differential between the upstream chamber and the downstream chamber that is created by the same high-energy stream of fluid utilized to treat the batch of material; each stream of fluid, in turn, being interrupted to create the same fluid pressure differential to allow introduction of another batch of material to each successive upstream station prior to the resumption of the fluidizing operation at that station.

As will be realized by those skilled in this art, the apparatus and process of the invention can be successfully used for treating material for different purposes such as, for example, drying the material, moistening the material, and other related uses. When the arrangement is used for drying the finely divided solid material, then the fluid medium used to treat the material is preferably air or suitably heated air. On the other hand, if the apparatus of the invention is to be used for adding moisture to the solid material particles, then the medium is or may be a vapor that is capable of delivering the desired moisture to the particles. In either of these cases, that is, when drying or moistening the solid particles, or in other cases, the transfer operation of the batch of particles from one chamber to the next is positively performed by the fluid pressure differential that acts equally well in transferring a variety of different size and weight of particles while performing any desired operation.

Accordingly, it is another object of the present invention to provide a batch-type fluidizing apparatus and process that can be utilized for a variety of purposes on a variety of different finely divided solid materials.

It is still a further object of the present invention to provide an in-line fluidizing apparatus and related process that contemplates the interruption of the stream of fluid in the downstream chamber into which a new batch of material is being introduced to create a differential pressure that is utilized to transfer the contents from an upstream chamber to said downstream chamber.

It is still a further object of the present invention to provide a batch-type fluidizing arrangement of the type described wherein is provided an independent door for each transfer passage which is operated in conjunction with and responsive to a centralized timer and control means that additionally operates a related interrupter valve to create a differential pressure at the proper time for transfer of the batch of material from one chamber to another through said passage.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring now to the drawings:

FIG. 1 is a schematic diagram of the over-all treating system incorporating the features of the present invention;

FIG. 2 is a sectional view taken along lines 2—2 of FIG. 1;

FIG. 3 is a sectional view taken along lines 3—3 of FIG. 1;

FIG. 4 is a schematic diagram of the control system of the apparatus of FIG. 1;

FIG. 5 is a timing diagram showing the sequence of operation of the operative components of the apparatus of FIG. 1; and FIG. 6 is a detailed showing of a portion of the apparatus of FIG. 1.

Referring now specifically to FIGURE 1 of the drawings, there is shown a multi-stage fluidized bed dryer 10 which incorporates the improved structural arrangement of the invention and which can be used in practicing the process of the invention. The dryer 10 comprises a fabricated multi-chamber fluidizer unit 11 that is disposed above a hot-air manifold 12 which is fed from a suitable heat exchanger 13 and a high capacity fan 14 which is illustrated in this figure. As previously mentioned, it is to be understood that the apparatus and process of the present invention are useful in other fluidizing arrangements employing beds of fluidized solids, and the fluidized bed dryer 10 in this case is shown and specifically described only as being illustrative of one particular application of the apparatus and process of this invention.

The fabricated fluidizer unit 11 comprises a number of equally spaced partitions 15 that define a plurality of vertically extending drying chambers 17, 18, 19, 20 and a discharge chamber 21 having a conventional star wheel discharge valve 21a at the lower end thereof. A charging hopper, generally designated by the reference numeral 22, is provided at the end of the fluidizing unit 11 opposite the discharge chamber 21, said charging hopper 22 being for the purpose of supplying a batch 23 of relatively finely divided solid material to the first in-line chamber 17 of the fluidizing unit 11 for treatment.

Each of the in-line chambers 17–20 is provided with a tapered bottom portion 25 with a retaining screen 26 disposed over an air inlet mouth 27. As shown in FIG. 1, each batch 23 of finely divided solid material rests in the tapered bottom portion 25 upon the screen 26 after it has been introduced into the chamber 17 prior to the fluidizing operation since the weave of the screen is selected to be sufficiently small to prevent the passage of the solid particles while at the same time allowing the passage of air into the chamber 17 through the mouth 27. Similarly, each of the other chambers 18–20 have a retaining screen 26 that prevents the solid particles being treated from entering the manifold 12.

As is evident from FIG. 1, the fluidizing unit 11 is charged with a fresh batch 23 of material through a pivotal door, indicated by the reference indicia $D_0$, which, when opened to the dotted-line position of this figure by fluid motor and lever assembly $DA_0$, allows the solid material to enter the first chamber 17 in the manner indicated.

The mouths 27 of each of the drying chambers 17–20 are connected to separate inlet pipes 29 of the manifold 12. These pipes 29 supply equal amounts of drying medium to the drying chambers 17–20 through the mouths 27 and the supply of air to any one of said chambers 17–20 can be interrupted at any time by independent interrupter valves $V_1$, $V_2$, $V_3$, $V_4$, respectively. For example, in the schematic showing of FIG. 1, the valve of $V_1$ is in the closed condition so that the finely divided solid matter rests in the tapered bottom portion 25, as mentioned above. However, when a particular valve is open, as is the case with the valves $V_2$, $V_3$, and $V_4$ in this figure, the finely divided solid matter is activated to a fluidized state through the action of the stream of air supplied by pipes 29.

As the solid matter in these chambers 18, 19, 20 is circulated by the stream of fluid, the desired drying action takes place through the intimate contact between the drying gases and the treated solids. As well illustrated in FIG. 1, the circulation of the solid material is generally upward along the rising column of pressurized air in the center of the chambers 17–20 and then downwardly along the sides of said chambers until being entrapped by the boundary layer of the column to be driven upwardly again. Throughout the fluidizing operation of the unit 11, the fluid pressure and velocity are maintained sufficiently high and the size of the pipes 29 is selected to be large enough to supply a sufficiently large volume of air to keep all of the particles in the chambers 17–20 in a fluidized state during both the upward columnar movement and the downward return movement, thus giving greater drying efficiency. The expended gases are driven off from the fluidized beds and pass through the open passageway 33 disposed at the top of the fluidizing unit 11 and finally exits the fluidizing unit 11 through the box filter 34 that is positioned atop the discharge chamber 21.

The interrupter valves $V_1$–$V_4$ in the preferred embodiment illustrated comprise a slide 35 that moves in a groove formed in a slide housing 36 positioned in the pipes 29, as shown in FIGS. 1 and 2. It will be realized from viewing FIG. 2 that the slide 35 of the valves $V_1$–$V_4$ moves in the housing 36 to either completely close the pipe 29 to block the flow of air (as shown in the full-line position of FIG. 2) or to completely open the pipe 29 to allow the air to pass (note the open dotted-line position of FIG. 2) in response to a respective fluid motor $VA_1$–$VA_4$. This arrangement allows for rapid actuation of the slide member 35 to bring about an immediate resumption of a fluidizing operation upon filling of the chambers 17–20 with a fresh batch of material as well as a rapid cut-off of air flow after the transfer of the material to the next downstream chamber, as will presently be explained.

Each of the partitions 15 has a passage 40 formed therein adjacent the lower portion of and connecting the chambers 17–21; said passages 40 having pivotal doors $D_1$, $D_2$, $D_3$, $D_4$ suitably positioned across said openings to confine and isolate the contents of the chambers 17–20 during the fluidizing operation. The doors $D_1$–$D_4$ are pivotally mounted on pivot bars 41 adjacent the upper limit of the passages 40 and each of said doors $D_1$–$D_4$ are suitably connected to a respective fluid motor and lever assembly $DA_1$–$DA_4$. The fluid motor and lever assemblies $DA_1$–$DA_4$ are capable of swinging the doors $D_1$–$D_4$ through an angle of approximately 45° from the full-line position to a dotted-line position, as shown on the door $D_1$ in FIG. 1. Thus, when the door $D_1$ is actuated to its open position, the chamber 17 is divided into upper and lower portions 42, 43, respectively, and said door $D_1$ is in opposition to the mouth 27 of the chamber 17, as is also the case in each of the other chambers 18–20 when their respective doors $D_2$–$D_4$ are opened.

As best shown in FIG. 3 the air motor and lever actuator assemblies $DA_1$–$DA_4$ for the doors $D_1$–$D_4$ are pivotally mounted by a suitable pin 50 on the back wall of the fluidizing unit 11 so that each is capable of the required movement during the opening operation for said doors $D_1$–$D_4$. Also, in the figure it can be seen that the doors $D_1$–$D_4$ extend the full width of the respective chambers 17–20 so that the lower portion 43 is sealed from the upper portion 42 of the chambers 17–20 when the doors $D_1$–$D_4$ are opened to the full dotted-line position across the chamber; suitable flexible gaskets 44 being provided around the free edges of said doors $D_1$–$D_4$ to improve the seal with the mating structure of the unit 11. As will be seen in detail later, this sealing off of the lower portion 43 is important since it causes a substantial build-up of pressure in said lower portion 43 due to the constant pressurized air stream entering that chamber through the mouth 27 during the transfer operation, so that a rapid transfer of the solid material in its fluid carrier to the downstream chamber can be effected.

In order to provide for coordination between the operation of the valves $V_1$–$V_4$ and the doors $D_1$–$D_4$ to perform the fluidizing operation of the invention and to perform the necessary transfer function of the batches of solid material from the upstream chamber to the downstream chamber, there is provided a central timer and control means 55, as schematically shown in FIG. 4 of the drawings. Each of the door actuators $DA_1$–$DA_4$ and the valve actuators $VA_1$–$VA_4$ are suitably connected to said control means 55 for operation in the desired timed relationship that is schematically illustrated in the timing diagram of FIG. 5.

In operation as can be seen in FIG. 5, assuming that the condition of FIG. 1 exists at the start of each cycle, the door $D_0$ has just been closed thereby determining the size of the fresh batch of finely divided material that is now resting in the tapered portion 25 of the chamber 17. The valve $V_1$ is opened as soon as the door $D_0$ is completely closed (note dashed reference line 54 in FIG. 5) so that the bed of material in the chamber 17 is immediately fluidized. At this point then the contents of all of the chambers 17–20 are fluidized beds of solid material and each chamber is operating to dry an individual batch of material completely independently of the adjacent chamber.

At this point in the cycle, the batch of material in the last fluidizing chamber 20 that has now been treated in each of the fluidizing chambers 17–20 is ready for transfer into the discharge chamber 21. To do this, the opening of the door $D_4$ is initiated (as indicated by the dashed line 55) and since the door $D_4$ is relatively large, it takes the fluid motor and lever assembly $DA_4$ a short time to complete the opening of said door $D_4$; which operation is represented by the sloping line up to the indicated full open position. It will be realized, from the timing chart of FIG. 5, that the valve $V_4$ remains open so that the batch of material in the chamber 20 is still being fluidized to not only take full advantage of the air to complete the treatment of the solid material but to enable the transfer operation to be initiated even while the door $D_4$ is still opening.

This physical opening of the door $D_4$, that is of course also representative of the opening of each of the other doors $D_1$–$D_3$, is shown in FIG. 6. To explain, it will be noted that as the door $D_4$ swings to the full-line position of this figure, that is, as said door $D_4$ is extended approximately two-thirds of the way across the extent of the chamber 20, the total pressure on the right-hand side of the door becomes progressively greater than the generally ambient pressure that exists in the discharge chamber 21 so that the fluidized particles are continuously blown into said chamber by this pressure differential. As the door $D_4$ reaches the full open position (dotted-line position), the lower portion 43 of the chamber 20 in effect becomes a part of the discharge chamber 21 and the remaining contents are transferred as the high-pressure fluidized material seeks the lower pressure of said discharge chamber 21. It should be recognized that this pressurized transfer is substantially aided by the positioning of the door $D_4$ at an angle of preferably substantially 45°, since the momentum of the particles after they collide with said door $D_4$ is sufficient to carry the same along a deflected path into said discharge chamber 21.

It will be understood that the door $D_4$ need remain in the full open position with the increased pressure differential across the passage 40 for only a short time for the transfer operation of the batch in the chamber 20 to be completed.

As was indicated earlier, the ejection of the air from the pipe 29 into the chambers 17–20 takes the form of a stream of air that occupies approximately the middle of the cross-section of the chamber and the solid material is continuously circulated along this upward path and downwardly along the outsides of the chamber in one continuous motion during the fluidizing operation. This motion of the solid particles in the chamber 20 is particularly useful in the transferring operation since this high velocity column of air causes low pressure boundary layer regions that serve to entrain the particles returning to the bottom of the chamber along the upper surface of the door $D_4$ (note flow arrows in FIG. 6) and thrust them upwardly again, whereupon they impinge upon the under surface of the door $D_4$ and are deflected or diverted through the passage 40 in the manner indicated; which entrainment and resultant deflection is continued from the time that the door is placed in opposed relationship to the mouth 27 of the chamber (full-line position of FIG. 6) until the door $D_4$ is in the full-open position and the upper portion 42 is sealed with respect to the lower portion 43 of said chamber.

To continue the illustrative description of the fluidizing operation in the chamber 20, the next step is to interrupt the air flow in pipe 29 by closing the valve $V_4$ as can be seen in the timing cycle of FIG. 5 (noted by the dashed line 56). As indicated, this valving operation is carried out rapidly by the air motor $VA_4$ by moving the interrupter plate 35 across the pipe 29 to cut off the air flow from the manifold 12. At the same time, the closing of the door $D_4$ is initiated by the fluid motor and lever assembly $DA_4$ and since the fluidizing air flow has not been discontinued in the chamber 20, the door $D_4$ will be free to form a satisfactory seal with the partition 15 without fear of trapping loose particles along the sealing periphery.

With the door $D_4$ closed and the chamber 20 empty due to the transfer of the batch of material into the discharge chamber 21 for final discharge through the star wheel valve 21a, the timer and control means 55 opens the door $D_3$ (see dashed line 57 in FIG. 5) and the batch contained in the chamber 19 is similarly transferred to the downstream chamber 20 for the final fluidizing operation. It will be remembered that the valve $V_4$ is closed during this transfer operation so that the particles are rapidly blown and deflected into the chamber without opposition from said downstream chamber 20. When the door $D_3$ is completely closed, the valve $V_4$ opens (note dashed line 58) thus initiating said final fluidizing step that takes place in the chamber 20.

As before, the valve $V_3$ has been closed prior to the initiation of the closing of the door $D_3$ so that particles will not be trapped at the sealing periphery of the door $D_3$ and the partition 15. While the valve $V_3$ is closed, the door $D_2$ will open, the contents of the chamber 18 will be transferred by the fluidizing stream into the chamber 19 whereupon the fluidizing operation in chamber 19 is once again resumed by the opening of the valve $V_3$.

It should now be apparent to those skilled in the art that the coordinating opening and closing of the doors $D_1$–$D_4$ and the valves $V_1$–$V_4$ is continued in sequence through the chambers 17 and 18 and then is repeated so that there is a continuous drying cycle created that takes advantage of the small batch-type drying arrangements, since during each cycle of the operation of the fluidizing unit 11 a completely treated batch of material that has gone through each of the stages in the separate chambers 17–20 is transferred into the discharge chamber 21 so that the star wheel valve 21a always has a sufficient supply of treated product for discharge to a suitable receptacle. It is also apparent that with the use of the novel pivotally swinging doors $D_1$–$D_4$ that the discharge of the batches of material from one chamber and the transfer to the next is advantageously carried out by the same full fluid power means that provides the fluidizing operation; such discharge and transfer being carried out without the problem of clogging in the passages 40 between the adjacent chambers that has heretobefore been a problem in this type of drying operation. Also, it can be seen that the drying operation is extremely efficient since the material is passed through four successive timed drying operations and that the full force of the fluidizing stream is present even during the transfer operation.

It is further significant to note in the process of the present invention that due to the discontinuance of the fluidizing operation in the downstream chamber as the batch of material is transferred from the upstream chamber, the transfer of substantially the entire contents of the chamber is effected each time since the high-pressure differential across the passage creates a positive and powerful conveying force on the fluidized particles. Further, in the arrangement of the invention, this differential in pressure across the connecting passage between the chambers means that there is little chance for the particles of material that have already reached the downstream chamber to feed back into the upstream chamber when the door D is opened.

While the dryer 10 is disclosed with a heater 13 in the illustrated combination, it is to be realized that the drying operation could be successfully carried out without heat being applied to the treating medium before it is injected into the fluidizing unit 11. In fact, in many cases this latter mode of operation would be preferred such as where it is desired to cool the solid material during the fluidization of the same. Also, of course, where the solid material is to be moisturized or otherwise chemically treated, the heater 13 would be replaced by the appropriate conditioner for the treating medium to carry out the operation being performed.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. A batch-type fluidizing apparatus for treating relatively finely divided solid material comprising a plurality of vertically extending chambers each having an upper and lower portion, said chambers being arranged in-line in the horizontal direction, means for introducing a batch of said solid material to be treated into the first of said in-line chambers, power means for introducing relatively high-pressure, high velocity streams of fluid into the lower portion of each of said chambers to suspend the solid material in that chamber, each of said chambers being connected to the adjacent chamber by a passage, an independent door for each passage, means to establish a pressure differential across said passage, and control means to operate each door to permit transfer of said batch of material from an upstream chamber to a downstream chamber in response to said pressure differential across said passage, each door being positionable across said upstream chamber between said upper and lower portions in opposed relationship to said fluid power means when said door is in the open position so as to serve to divert the suspended solid material in said upstream chamber to said downstream chamber through said passage.

2. The combination of claim 1 wherein each door is pivotally mounted about a pivot adjacent the upper limit of the respective passage, said door extending at substantially a 45° angle with respect to said passage, gasket means on said door serving to seal the upper portion of said upstream chamber from the lower portion thereof when said door is in the open position, whereby said material is physically diverted and forced by fluid pressure through said passage to said other chamber.

3. The combination of claim 1, wherein said means for establishing said pressure differential includes an interrupter valve to control the introduction of said stream of fluid to each of said chambers, and wherein is further provided retaining means extending across the bottom of each of said chambers to retain said solid material in said chamber during periods when said stream of fluid is interrupted, and second control means interconnected with the first mentioned control means so as to close that interrupter valve associated with said downstream chamber during the transfer operation of said batch of material from said upstream chamber to said downstream chamber.

4. The process of treating successive batches of relatively finely divided solid material in a plurality of in-line chambers comprising the steps of providing a relatively low-pressure atmosphere in an upstream chamber of said plurality, introducing a first batch of material to said upstream chamber, introducing a relatively high-pressure, high-velocity stream of fluid into said upstream chamber to fluidize said batch of material so as to form a suspension of the same in said upstream chamber, transferring said first batch of material as a whole to a downstream chamber by said high-pressure, high-velocity stream of fluid while said material is suspended in said fluid, interrupting said stream of fluid at said upstream station to re-establish said low-pressure atmosphere so that a second batch of material may be introduced to said upstream chamber.

5. The process of claim 4 including the additional step of introducing a second high-velocity, high-pressure fluid stream to said downstream chamber to fluidize said first batch of material prior to the introduction of said second batch to said upstream chamber.

6. The process of claim 4 wherein is further provided the additional step of preventing escape of material from said first batch from said upstream chamber prior to said transferring step by a positive barrier and wherein said transferring step includes the steps of moving said barrier across said upstream chamber thereby leaving an opening between said chambers, and deflecting at least a part of said material against said barrier through said opening.

References Cited
UNITED STATES PATENTS 2,231,342  2/1941  Loyless _____ 34—57

FREDERICK L. MATTESON, JR., *Primary Examiner.*

JOHN J. CAMBY, *Examiner.*